Sept. 26, 1944.  W. B. CONWAY  2,358,792
FIREARM
Filed Dec. 2, 1940  3 Sheets-Sheet 1
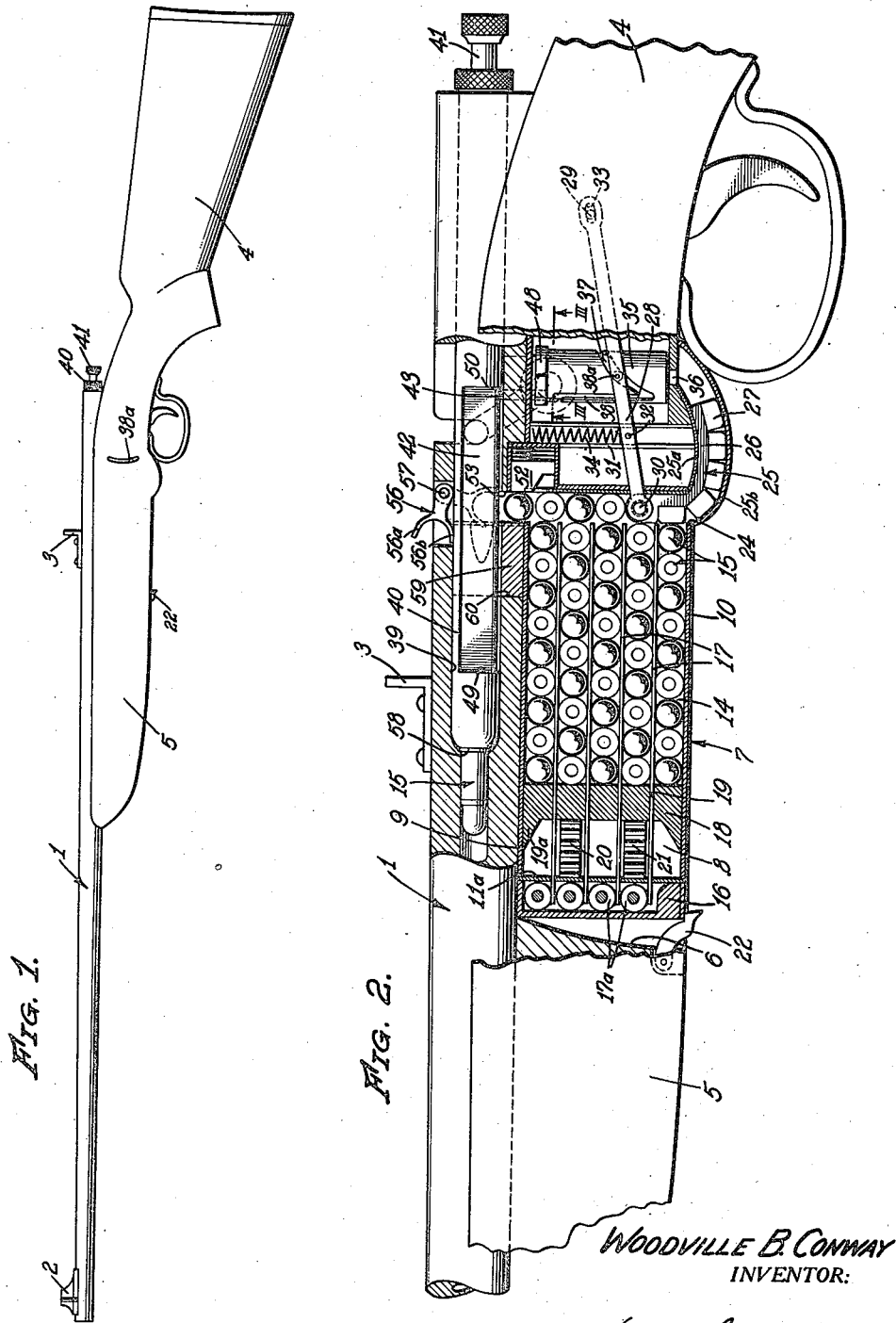
WOODVILLE B. CONWAY
INVENTOR:
BY Harold W. Mattingly
ATTORNEY

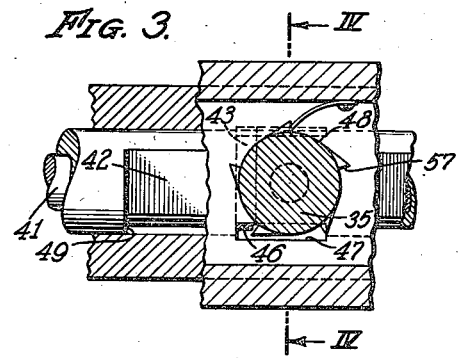
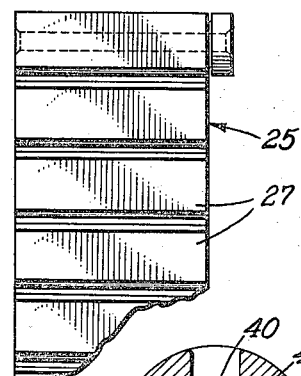
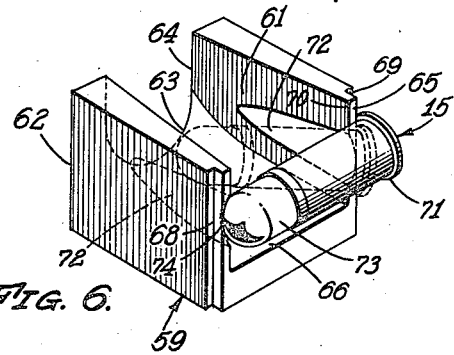
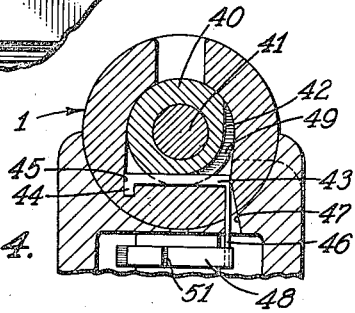
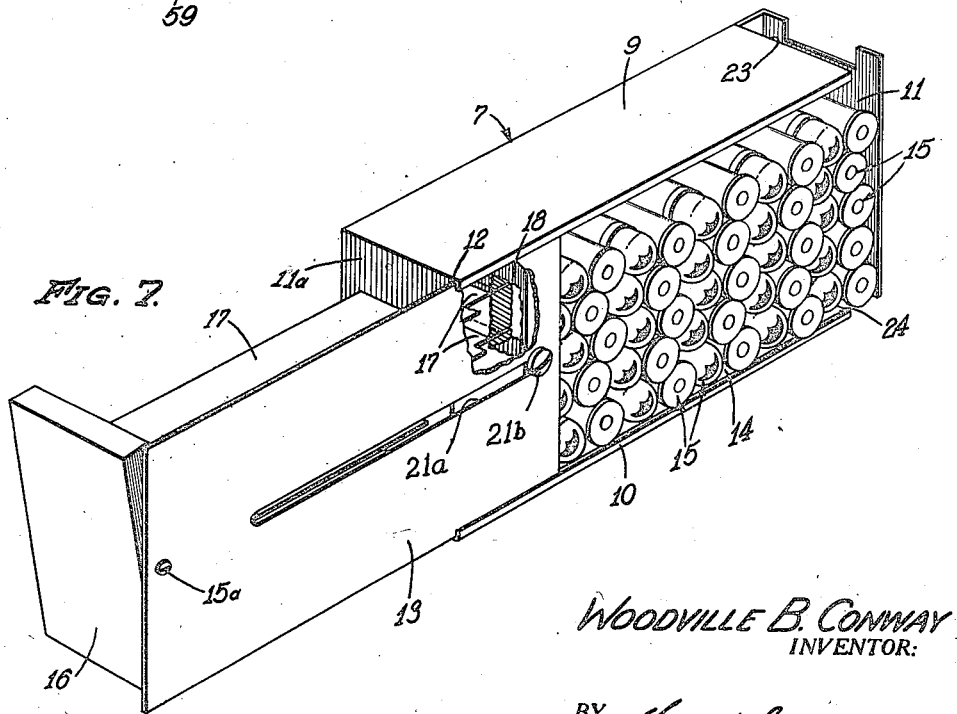

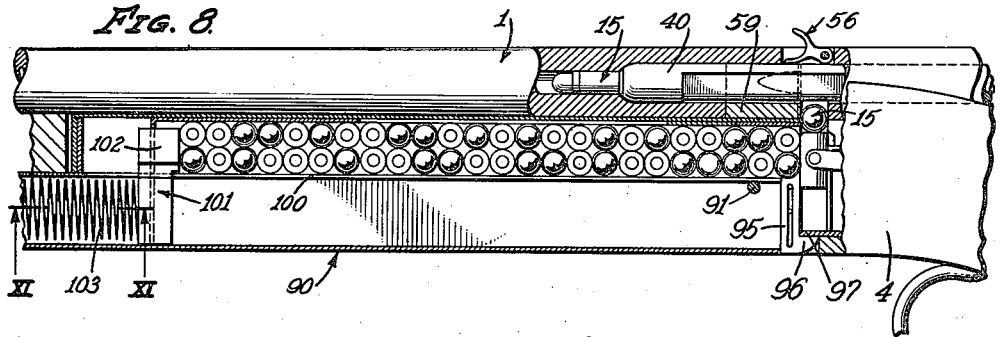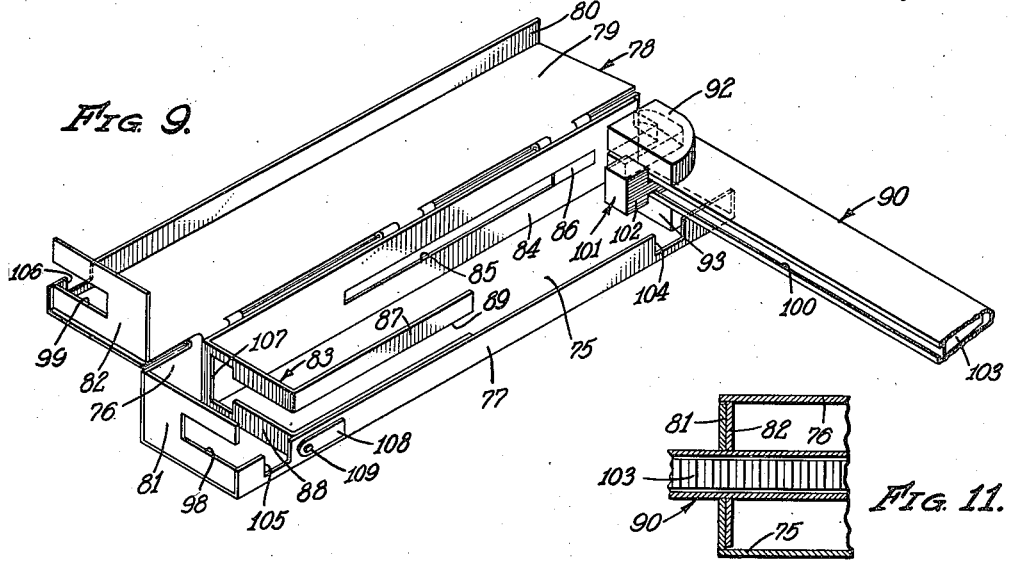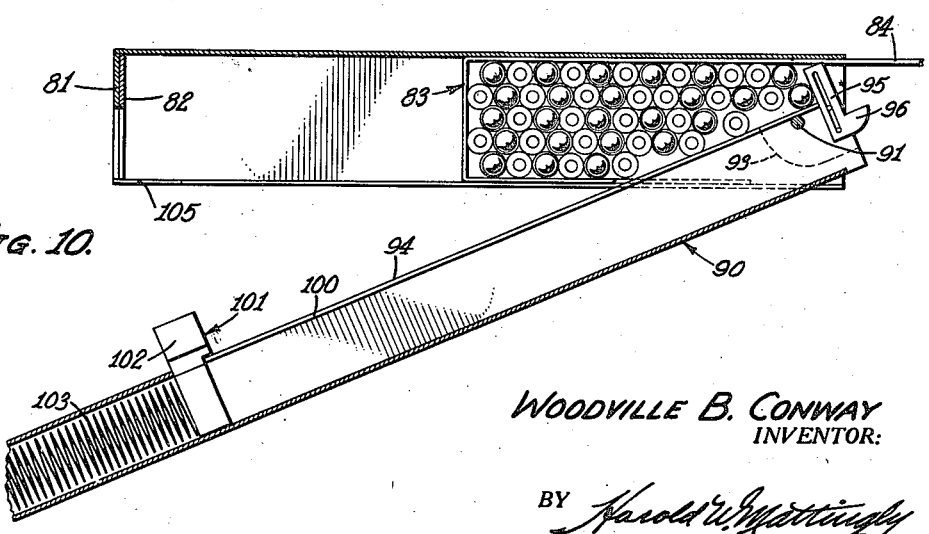

Patented Sept. 26, 1944

2,358,792

UNITED STATES PATENT OFFICE 2,358,792

FIREARM

Woodville B. Conway, Escondido, Calif.

Application December 2, 1940, Serial No. 368,213

7 Claims. (Cl. 42—17)

My invention relates to fire arms and has particular reference to a magazine and cartridge feeding mechanism which is particularly adapted for use with automatic rifles or machine guns.

Prior to my invention the magazines and cartridge feeding mechanisms of fire arms were so constructed as to require the careful loading of either the magazine or auxiliary loading device, or both, in order to provide a supply of cartridges in the gun.

In the case of machine guns, for example, the loading of the gun is effected by removing the cartridges one by one from the box or container in which they are packaged by the factory and inserting these cartridges one at a time into a belt or drum designed for use with the particular gun, due care being had to point all of the cartridges the same direction in the belt and to insure that each of the cartridges as it is inserted into the cartridge receiving receptacle provided in such belt or drum is moved to the proper location.

The requirement for the use of cartridge carrying belts or drums on the present types of machine guns is particularly disadvantageous when such machine guns are mounted on aeroplanes. In order to hold a sufficient number of cartridges, the drums must be very large and this is not practical because of the space and weight limitations which are encountered in aircraft constructions.

Belt type machine guns are, therefore, usually preferred, but the use of the belts gives rise to a different difficulty. The great centrifugal force which is developed on turns and on pulling out of dives is, of course, applied to the machine gun belts as well as to all parts of the aircraft. It is not uncommon for this force to be sufficient, when acting in a direction opposed to the direction of feeding of the belts, to cause the operation of the gun to be arrested. This not infrequently jams the gun, rendering it useless until such time as the plane can be landed and the necessary repairs and adjustments made.

As is the case with machine guns, so also in the loading of automatic rifles or repeating rifles, the cartridges must be removed from the packages or boxes in which they are shipped from the factory and placed one at a time either into the magazine of the gun or into clips or similar holding devices and then transferred from such clips to the gun magazine.

These prior magazine constructions are accordingly characterized by the loss of considerable time during loading operations, a loss which may well be of extreme importance when the guns are used in warfare. Furthermore, the requirement for manually loading the magazine or the cartridge holding device subjects the person who is performing the loading operation to the liability of accidents resulting from the handling of the cartridges as well as necessitating the soiling of his hands and perhaps his clothing. This latter disadvantage is particularly undesirable when the fire arms are used in various sports, such as target shooting. Furthermore, all of the fire arms which are commercially available are equipped with magazines which are so small as to hold only a few rounds of ammunition, thus requiring the frequent reloading of the fire arm in order to maintain the same in operation.

It is therefore an object of my invention to provide a fire arm magazine and cartridge feeding means therefor which overcomes the above noted disadvantages by providing for the reception and feeding of a much larger number of cartridges than has hitherto been possible.

It is also an object of my invention to provide a fire arm magazine which is so arranged as to permit the entire contents of a box of cartridges packed as shipped from the factory to be transferred to the magazine by a single operation.

It is a further object of my invention to provide a magazine of the character set forth in the preceding paragraph in which the cartridge receiving space within the magazine is of substantially the same size and shape as the box in which the cartridges are packed, whereby the entire contents of the box may be emptied into the magazine.

It is additionally an object of my invention to provide a cartridge feeding mechanism for use with a magazine of the character set forth hereinbefore which includes a means for turning the cartridges to a bullet foremost position irrespective of their disposition in the magazine.

It is a still further object of my invention to provide a cartridge feeding mechanism of the character set forth in the preceding paragraph which includes a means for feeding one cartridge from the magazine and into the chamber of the fire arm after each shot until the magazine is emptied.

It is also an object of my invention to provide a magazine and cartridge feeding mechanism therefor which is compact, simple in construction, and so arranged as to reduce to a minimum the likelihood of the mechanism becoming jammed or otherwise getting out of order.

Other objects and advantages of my invention will be apparent from a study of the following specifications, read in connection with the accompanying drawings, wherein:

Fig. 1 is an elevational view of a rifle equipped with one form of magazine and cartridge feeding device of my invention;

Fig. 2 is an enlarged elevational view of the gun illustrated in Fig. 1 with parts broken away and shown in section to illustrate the details of construction employed;

Fig. 3 is a fragmentary sectional view taken substantially along the line III—III of Fig. 2 illustrating the details of construction of one form of drive which may be used with the cartridge feeding mechanism;

Fig. 4 is a cross sectional view taken substantially along the line IV—IV of Fig. 3 illustrating additional details of construction;

Fig. 5 is an elevational view illustrating the appearance and construction of a cartridge engaging means employed with the feeding means;

Fig. 6 is a perspective view illustrating the details of construction of a device which operates to turn the cartridges to a bullet foremost position irrespective of the disposition of the cartridges at the time they are fed to the device;

Fig. 7 is a perspective view of the magazine with the cover open illustrating the manner in which an entire box load of cartridges may be received within the magazine;

Fig. 8 is a view similar to Fig. 2 but illustrating a different form of magazine which may be employed;

Fig. 9 is a perspective view illustrating the open position of the magazine;

Fig. 10 is a longitudinal sectional view through the magazine which is illustrated in Fig. 9 showing the details of interior construction; and Fig. 11 is a fragmentary sectional view taken substantially along the line XI—XI of Fig. 8.

For the purpose of simplifying the description and facilitating the ready understanding of my invention, I have illustrated in Figs. 1 and 2 the magazine and cartridge feeding mechanism as being applied to a rifle of the bolt-action type. It will be readily understood, of course, that the invention is also susceptible to application to guns of the repeating and automatic type as well as to machine guns and similar types of fire arms.

The fire arm which is illustrated in Figs. 1 and 2 comprises essentially a barrel 1 carrying front and rear sights 2 and 3, the barrel 1 being supported in a stock 4 usually formed of wood or similar material. The stock 4 serves also to house the firing and cartridge feeding mechanism for the gun. The firing mechanism has not been illustrated in these drawings for the reason that any suitable type of firing mechanism may be employed and such mechanism forms no part of the present invention.

The stock 4 includes a forepart 5 which is recessed as indicated at 6 in Fig. 2 to receive a magazine 7. The magazine 7 is preferably constructed along the lines illustrated in Figs. 2 and 7 and comprises a box-like member defined by a rear wall 8, upper and lower side walls 9 and 10, and end walls 11 and 11a. The front edges of the upper and lower side walls 9 and 10 are preferably grooved as indicated at 12 to slidably receive a front closure member or cover 13.

The general shape and size of the magazine 7 is made to substantially conform to the shape and size of a box or package in which the cartridges to be used with the gun are packed and shipped. The fire arm which is illustrated in these figures may, for example, comprise a .22 caliber rifle in which case the cartridge receiving space 14 which is defined by the magazine 7 is made of substantially the same size and configuration as the boxes in which .22 caliber cartridges are sold. .22 caliber cartridges are ordinarily sold in boxes of fifty with every alternate cartridge being packed opposite end to in the box; that is to say, alternate cartridges will be placed in the box with the bullet end down, whereas, the remaining alternate cartridges will be placed in the box with the bullet end up.

In order to the load the magazine the cover 13 is slid to an open position, such as that illustrated in Fig. 7, the magazine is placed directly over an open box of cartridges, and then the box and magazine are simultaneously inverted so as to permit the entire fifty cartridges to pass as a unit from the box in which they were packed into the magazine.

If desired, the cartridge receiving space 14 may be made of a shape and size conforming to two or more boxes of cartridges placed side by side or end to end. In such case, the magazine is placed over such a group of open boxes, and then the magazine and all of the boxes are simultaneously inverted to transfer the cartridges to the magazine, or the boxes may be emptied one at a time in the manner above described by moving the cover 13 toward closed position (after each box is emptied) a sufficient distance to retain the cartridges when the magazine is re-inverted. After the transfer, the cartridges will rest in the magazine 7 somewhat in the manner illustrated by cartridges 15 in Fig. 7. Thereafter the cover 13 may be slid to a closed position to prevent the cartridges from escaping from the magazine.

The end of the cover 13 opposite to the end 11 of the magazine pivotally supports, as by means of a pin 15a, a box-like end member 16 which carries a plurality of separators 17. The separators 17 comprise thin, flat members preferably formed of a stiff resilient material, such as spring steel. The members 17 extend forwardly from the member 16 parallel to each other and parallel to the length of the magazine 7 and through appropriately disposed slots in the end wall 11a. These members are spaced from each other a distance corresponding to the diameter of the cartridges 15 and each has a length about one cartridge diameter less than the length of the space 14. Thus, when the cover is slid to a closed position, the separators 17 are forced between adjacent rows of cartridges 15 so as to divide the entire group of cartridges into five rows of ten cartridges each as is indicated in Fig. 2.

Each of the separators 17 is preferably supported on the closure or end member 16 for pivotal movement relative thereto as by securing each separator 17 to a pivot member 17a extending transversely of the magazine and disposed within the box-like end member 16. This construction permits the end member 16 to be moved to an angular position such as that illustrated in Fig. 7 before the cover 13 is closed, this operation serving to withdraw or retract the upper ones of the separators 17 relative to the lower ones so as to stagger the locations of their ends as indicated in Fig. 7 where the parts are broken away. Thus, when the cover 13 is closed, the separators 17 engage vertical stacks of cartridges 15 in succession rather than simultaneously, thereby materially reducing the resistance offered by the cartridges to the closing of the cover.

Each of these five rows of cartridges is preferably urged toward the end wall 11 as by slidably supporting within the magazine 7 a pusher member 18 which may be slotted as indicated at 19 in Fig. 2 to receive each of the separator members 17. A pair of compression springs 20 and 21 are interposed between the end 11a and the pusher 18 and preferably between separate pairs of the separator members, so as to provide a thrust tending to slide the pushed member 18 to the right as viewed in Figs. 2 and 7. The pusher 18 may be guided in its movement within the magazine 7 as the cartridges 15 are removed by wings or guide members 19a. To permit ready loading of the magazine as previously described, the cover 13 is provided with a longitudinal slot 21a having a length substantially equal to the length of required movement of the pusher member 18. A screw or pin 21b is secured to the pusher member 18 in a position to pass through the slot 21a so that when the cover 13 is slid to an open position such as that illustrated in Fig. 7, the right-hand end of the slot 21a will engage the screw 21b and slide the pusher member to the left to compress the springs 20 and 21. After the magazine is filled the sliding of the cover 13 to its closed position releases the pusher member 18, whereupon it is urged to the right by the springs 20 and 21. After the cover is closed, the magazine may be slipped into the recess 6 and held therein as by means of a latch member indicated diagrammatically at 22 in Fig. 2.

Provision may be made for feeding the cartridges from the magazine 7 by cutting the upper and lower side walls 9 and 10 to define upper and lower slots 23 and 24. These slots will be aligned with the extreme right hand cartridges of each of the rows of cartridges, it being remembered that each of the rows is continuously urged to the right as viewed in Fig. 2 by the springs 20 and 21.

The cartridges may be fed upwardly through the upper slot 23 by employing a feeding mechanism such as that illustrated in Figs. 2 through 5. This mechanism preferably includes a feeding member 25 which is slidably received within an arcuate channel defined by upper and lower housing members 25a and 25b. The feeding member 25 may comprise a short length of flexible material 26, such as leather or a suitable fabric. To the under face of the belt 26 is secured, as by rivets or adhesive, a plurality of bar-like spacer members 27, one of such members being employed for each of the rows of cartridges.

Each of the members 27 has a length substantially equal to the width of the belt 26 which is in turn made substantially equal to the overall length of the cartridges 15. Furthermore, the width of each of the bar members 27 is made substantially equal to the diameter of the cartridges 15 and the thickness of the bar members 27 is so arranged that the combined thickness of bar member and belt 26 is such as to loosely fill the lower slot 24.

The feeding member 25 may be moved upwardly through the lower slot 24 and in a direction parallel to the end wall 11 toward the upper slot 23 as by providing a driving lever 28 which may be pivotally secured at one end to the stock 4 as by means of a pivot 29 and pivotally secured to the feeding member 25 at the opposite end as by means of a pivot 30. Substantially straight line motion of the end carrying the pivot 30 may be insured by providing a channel 31 for guiding a sliding block (not shown) which is in turn engaged by a pin 32 carried by the lever 28 and by appropriately slotting the inner end of the lever 28 as indicated at 33. The channel 31 may serve as a housing for a compression spring 34 adapted to normally and continuously urge the lever 28 to a lowermost position disposing the feeding member 25 completely away from the interior of the magazine 7.

Vertical pivotal movement of the lever 28 in a step by step fashion in synchronism with the operation of the gun may be produced by employing a cam member 35. The member 35 may comprise a cylinder journaled as indicated at 36 for rotation about a vertical axis, the cylinder 35 being provided with a one turn helical groove 37, the upper and lower ends of which are interconnected by a vertically extending groove 38, drivable connection between the cam member 35 and the link 28 being effected as by means of a pin 38a which is secured to the link 28 and extended into the groove 37—38.

The cylinder 35 is preferably coupled to the gun in such manner that it is rotated through a fraction of a revolution each time the gun is operated, the drive for the cylinder 35 being so arranged that the same number of rotary steps are provided for each operation as there are rows of cartridges 15 contained in the magazine 7. Thus, in the form of the device illustrated in Fig. 2, the cam member 35 is arranged to be rotated through one-fifth of a revolution upon each operation of the gun.

I have illustrated in Figs. 2, 3 and 4 one form of drive or linkage which may be employed for so rotating the cam member 35.

In a bolt-action fire arm, such as that illustrated in Figs. 1 and 2, the stock end of the barrel is enlarged as indicated at 39 to receive a sliding bolt 40 which serves the purpose of driving the cartridges into the barrel prior to the firing thereof, houses a hammer mechanism 41 by means of which the cartridge is fired, and includes an ejector mechanism for withdrawing the shell after the cartridge has been fired. The bolt 40 is preferably cut away as indicated at 42 in Figs. 2 and 4 to permit the bolt 40 to pass over a U-shaped drive member 43 which is extended transversely across the rear portion of the bore 39.

The member 43 includes a short, downwardly depending lug 44 which is received in a guiding slot 45 serving to support the member 43 for limited sliding movement in the direction of the length of the barrel 1. The opposite end of the member 43 includes a spring finger 46 which is extended downwardly through a slot 47 in the barrel 1 to a point adjacent a ratchet wheel portion 48 which is formed on the upper end of the cam member 35.

The cut away portion 42 of the bolt 40 terminates in shoulders 49 and 50 and these shoulders are so disposed that when the bolt 40 is slid to its foremost position, as illustrated in Fig. 2, the shoulder 50 will, by virtue of its engagement with the member 43, serve to slide that member forwardly to a position such as that illustrated in Fig. 3.

After the gun is fired, the bolt 40 is slid rearwardly for the purpose of ejecting the spent cartridges and the shoulder 49 is disposed in such position that it will engage the member 43 and move the member to a rearwardmost position upon arrival of the bolt 40 to its rearwardmost position, the spring finger 46 engaging a tooth 51 forming a part of the ratchet wheel portion 48. The portion 48 is provided with five of the teeth 51 and the amount of movement which is thus imparted to the member 43 is so adjusted as to result in the rotation of the cam member 35 through one-fifth of a revolution. Upon the subsequent forward motion of the bolt 40, the movement of the spring finger 46 to its foremost position past the last tooth 51 is permitted by the spring character of the finger 46 and the width of the slot 47 through which it is extended.

It will thus be seen that the cam member 35 will be rotated through one-fifth of a revolution upon each retraction of the bolt 40, and that such rotation of the cam member 35 will serve to lift the feeding member 25 a distance corresponding to the diameter of one of the cartridges 15. This serves to lift the entire stack of cartridges which is pressed against the magazine end wall 11 so that the cartridges are successively passed upwardly through the upper slot 23, past a spring pressed detent 52, and into the bolt receiving bore 39 through an opening 53 extended through the lower portion of the barrel 1.

The lower end of the cam groove 37 is preferably made steeper than is the remainder of the groove so that the first movement of the feeding member 25 is substantially equal to twice the diameter of the cartridges 15 or sufficient to move the uppermost cartridge in the stack to a sufficient height to reach the bore 39. Subsequent upward movements of the feeding member 25 are each made equal to the diameter of one cartridge.

The operation of lifting the cartridges occurs upon the retraction of the bolt 40, which retraction serves also to allow a pivoted guiding member 56 which is hingedly supported as by means of a pivot pin 57 to the upper portion of the barrel to swing downwardly into the bore 39 into a position such as that illustrated by dotted lines in Fig. 2. Thus, the uppermost cartridge of the end stack is lifted into the bore 39 in a position disposed between arms 56a and 56b of the guiding member 56 so that upon forward motion of the bolt 40, the foremost end 58 thereof will engage the guiding member 56 and swing the same in a clockwise direction as viewed in Fig. 2. This serves to move the cartridge forwardly along the bore 39.

It will be recalled that the cartridges 15 are arranged alternately in the magazine 7. These alternate ones of the cartridges have the bullet ends thereof pointed in opposite directions. It is, therefore, necessary that the cartridge which is moved forward by the guiding member 56 be turned from a position extending transversely of the bore 39 to a position extending parallel to that bore, and that the turning of the cartridge be accomplished in such manner as to place the cartridge in the bore 39 in a bullet foremost position, that is with the cartridge disposed in a position to be received within the chambered portion of the rifle bore.

I accomplish this turning of the cartridge by means of a turning member 59 which is extended upwardly into the barrel 1 at a point disposed immediately in front of the guiding member 56, the turning member 59 being received in the opening 53 which is extended forwardly for that purpose to a point such as that indicated at 60 in Fig. 2. The member 59 may comprise a blocklike member of rectangular form adapted to be closely received within the forward portion of the opening 53. A groove or channel 61 is preferably cut into the upper surface of the member 59, that portion of the groove 61 adjacent the forwardmost end 62 of the block 59 having substantially a U-shape including a semi-circular lower portion 63 and an upper straight sided portion 64. The diameter of the semi-circular portion 63 conforms to the diameter of the bore 39 and is so positioned in the block 59 as to be accurately aligned with the bore 39 when the block 59 is positioned as indicated in Fig. 2.

The groove 61 extends rearwardly from the forwardmost face 62 of the block and in so doing gradually changes its cross sectional shape to provide a groove of substantially rectangular cross section at the rearwardmost end 65 of the block.

When rimmed cartridges are used, the sides of the block are preferably cut away as indicated at 68 and 69 in Fig. 6 to provide relatively narrow wing-like portions 70 adapted to catch behind the rim portion 71 of the cartridge. The inner surfaces of the groove 61 are in themselves grooved, as indicated at 72, to provide round bottomed recessses more or less conforming to the curvature of the end of the bullet portion 73 of the cartridge 15.

The grooves 72 are tapered to a maximum depth at the location of the wing portions 70, the depth of the grooves 72 at these portions being such as to provide an extremely thin feather edge 74. The width of the block 59 and consequently the width of the opening 53—60 in which it is received is made slightly greater than the overall length of the cartridge 15 so that as the cartridge is moved forward by the guiding member 56, it will be moved into a position such as that illustrated in Fig. 6 to dispose the flange portion 71 of a rimmed cartridge behind one or the other of the wing portions 70. As the bolt 40 is moved still further forward, the pressure of the guiding member 56 on the cartridge 15 will serve to swing the cartridge about the rim end of the cartridge as a pivot, forward motion of the bullet end being permitted by the reception of the bullet into the groove 72 and the forward motion of the rim end of the cartridge being prevented by engagement of the rim 71 with the wing 70.

It will be observed that this pivoting action will take place to swing the bullet end of the cartridge into a foremost position irrespective of which of the wings 70 engages the cartridge rim 71. The cartridge 15 thereupon falls into the groove 61 which serves to guide the cartridge into a bore 39 as the cartridge is pushed forwardly by the end 58 of the bolt 40. The cartridge is then slid along the length of the bore 39 and into the cartridge receiving chamber of the rifle where it may be fired and later ejected in the usual manner.

Substantially the same operation occurs when rimless cartridges are used except that the wings 70 do not catch the cap end of the cartridge. The same turning of the cartridge takes place, however, for the reason that the vertical height of the cap end is greater than the width of the groove 72 and so prevents the cap end from moving forward. Forward movement of the bullet end is permitted for the reason that the vertical height of the bullet at its point is very small (in any event much less than the width of the groove 72) and permits the point of the bullet to pass along the groove 72. The operation of feeding, firing and ejecting is repeated for each actuation of the bolt 40 until all of the cartridges comprising the stack which is held adjacent the magazine end wall 11 is moved one by one into the chamber of the rifle.

The retraction of the bolt 40 following the firing of the last one of the cartridges in such stack rotates the cam member 35 to a position such that the pin 38a is aligned with the vertical portion 38 of the cam groove, whereupon the compression spring 34 moves the feeding member 25 into its lowermost position in which it is received in its entirety within the arcuate channel which is defined by the housing members 25a and 25b. The magazine springs 20 and 21 then serve to move each of the rows of cartridges 15 forward a distance corresponding to the diameter of one of the cartridges, thus establishing a new stack of cartridges immediately adjacent the magazine end wall 11.

The angular positioning of the cam member 35 is preferably such that the above described operation occurs during the first part of the rotation of the cam member 35 so as to provide ample time for the establishing of the new stack of cartridges. Continued rotation of the cam member 35 serves to lift the feeding member 25 a distance sufficient to move the uppermost cartridge in the new stack into a position immediately before the turning member 59. Thus, it will be seen that the rifle may be repeatedly fired and that each time the bolt is actuated to withdraw the spent cartridge, another loaded cartridge will be disposed immediately before the bolt so as to be moved into the firing chamber of the gun upon the next forward motion of the bolt. It will be furthermore observed that this operation can be continued without interruption until the last of the cartridges has been moved from the magazine.

In case it is desired to remove the magazine from the gun, it is necessary that the feeding member 25 be disposed in its lowermost position. In case the removal of the magazine is desired at a time when the feeding member normally occupies a position other than this lowermost position, the feeding member may be moved to its lowermost position as by withdrawing the pin 38a which is for this purpose preferably extended exteriorly of the stock 4 to permit its ready retraction. Retraction of the pin 38a will permit the compression spring 34 to disengage the feeding member 25 from the magazine so that the magazine may then be removed from the gun.

I have found that considerable resistance is offered to the lifting of the feeding member 25 when the cartridges 15 are of relatively large caliber for the reason that as the stack of cartridges is lifted by the feeding member, the rows of cartridges tend to be pushed into the spaces between adjacent cartridges in the stack, requiring these rows to be pushed back against the force of the magazine springs 20 and 21 by the lifting of the cartridges in the stack.

I have illustrated in Figs. 8 through 11 a modified form of magazine which overcomes this disadvantage and which is particularly adapted for use on automatic rifles and machine guns because it reduces the power required to operate the feeding mechanism. This magazine comprises a box-like member including a bottom wall 75, at one edge of which is formed a rear wall 76 and at the opposite edge of which is formed a front wall portion 77, the portion 77 having a width somewhat less than one-half of the width of the back wall 76.

To the upper edge of the back wall 76 is hingedly attached a cover portion 78 including an upper wall portion 79 which carries on its free or outer edge a front wall portion 80, the wall portion 80 having a width substantially equal to the wall portion 77 and the width of both of these portions being so adjusted as to define a slot extending the full length of the magazine when the cover 78 is moved to a closed position. One end of the magazine is left open and the other end is closed as by means of end closure members 81 and 82 carried by the box and cover portions, respectively.

Within the interior of the box portion and upon the rear wall 76 I slidably support a U-shaped member 83 which includes a rear leg 84 having a width substantially equal to the interior width of the rear wall 76 and guided for slidable movement in the direction of the length of the magazine as by providing therein a slot 85 within which is received a lug 86 carried by the rear wall 76.

The bottom portion and other leg of the U are defined by upper and lower members 87 and 88 which are spaced from each other so as to define a slot 89 having a width conforming to the width of the slot which is left between the front wall portions 77 and 80 when the cover 78 is placed in a closed position.

The member 83 may be slid to a forward position such as that illustrated in Fig. 10 in which it will define a space between the bottom portion of the U-shaped member and the open end of the magazine substantially conforming to the size and shape of one or more of the boxes or packages within which the cartridges are packed. Thus, the entire contents of one or more boxes of cartridges may be transferred to the magazine and enclosed within the space defined by the U-shaped member.

It is intended that proper operation of the magazine will re-distribute the cartridges within the magazine in such manner as to dispose these cartridges in two long rows such as twenty-five each rather than the five rows of ten each as was the case with the previously described modification. For this purpose I employ a distributing member 90 which may comprise a length of flat tubular material pivotally secured to the bottom wall portion 75 of the magazine as by means of a pivot pin 91 permitting the distributing member to be moved from an open position, such as that illustrated in Fig. 9, to a closed position, such as that illustrated in Fig. 8.

The distributing member is adapted to be received in its closed position within the slot 89 and the corresponding slot which is defined by the adjacent edges of the forward wall portions 77 and 80 and may be supported within the magazine in alignment with such slots as by employing spacer or block members 92 and 93 disposed on opposite sides of the member 90. The block members 92 and 93 serve also to define an end wall for the magazine to prevent the inadvertent escape of the cartridges from the magazine after they have been initially placed therein and before the member 90 is moved to its closed position.

After the cartridges have been placed within the confines of the U-shaped member 83, the distributing member 90 may be pivotally moved from the open position as illustrated in Fig. 9 to the closed position as illustrated in Fig. 8, an under surface 94 of the distributing member 90 being thus brought into engagement with the cartridges which have been placed within the magazine. This action tends to mash the group of cartridges and, by virtue of their cylindrical shape, causes them to roll over each other and gradually be pushed out into a relatively elongated grouping, this lengthening of the cartridge grouping being permitted by the slidable movement of the U-shaped member 83 on the rear wall 76.

The pivot pin 91 is so located relative to the magazine and relative to the cartridge engaging surface 94 as to cause that surface to be disposed a distance from the rear wall 76 when the distributing member 90 is in its closed position which is equal to twice the diameter of a cartridge so that there is thus defined an elongated cartridge receiving space capable of containing two long rows of cartridges disposed somewhat in the manner illustrated in Fig. 8.

The block members 92 and 93 previously referred to have their lower faces disposed in alignment with the cartridge engaging edge 94 so that by moving the distributing member 90 to its closed position, the end of the magazine is opened to permit free passage of two rows of cartridges therefrom. Until the magazine is installed on the rifle, however, it is desirable that the cartridges be forcibly retained within the magazine and for this purpose I slidably mount upon the innermost end of the distributing member 90 a detent 95 which is normally urged by means of a spring (not shown) to an extended position such as that illustrated in Fig. 10 extending across the path of exit of the cartridges from the magazine.

The member 95 includes an outwardly extending nose portion 96 adapted to engage a coacting lug 97 formed on the stock 4 immediately adjacent the end of the recess within which the magazine is received so that as the magazine is slid upwardly into the recess, the detent 95 will be withdrawn to open the end of the magazine and permit the cartridges to be moved into the feeding mechanism of the gun.

The above described operation of redistributing the cartridges in the magazine is, of course, performed with the cover member 78 in a closed position and the distributing member 90 preferably serves also to lock the cover member 80 in such closed position. For this purpose the end walls 81 and 82 are provided with notches 98 and 99 adapted to receive the distributing member 90 so that when the distributing member 90 is received in these notches, the cover is held in the closed position.

The cartridge engaging surface 94 of the tubular distributing member 90 is preferably slotted as indicated at 100 in Fig. 9 and a pusher member 101 is slidably mounted within the interior of the tubular distributing member 90 and extended exteriorly thereof through the slot 100. The pusher member 101 is preferably substantially T-shaped so as to provide a relatively wide cartridge engaging portion 102 adapted to bear against both rows of cartridges somewhat in the manner illustrated in Fig. 8.

The pusher member 101 is normally urged toward the open end of the magazine as by interposing a compression spring 103 between the pusher member 101 and the outermost end of the distributing member 90. Thus, as the cartridges are fed into the rifle barrel by means of a feeding mechanism which may be constructed and arranged along the same lines as that described in connection with the previously described modification of my invention, both rows of cartridges are fed toward such feeding mechanism by the combined action of the spring 103 and the pusher member 101.

It will be appreciated, of course, that the pusher member must be withdrawn in such direction as to compress the spring 103 when the magazine is to be refilled and for this purpose I provide a notch 104 in the forward wall 77 permitting the pusher member 101 to be slid along the length of the distributing member 90 when that member is moved to an open position such as that illustrated in Fig. 9. This permits the pusher member 101 to be moved to a completely retracted position such as that illustrated in Fig. 10 and closing of the distributing member may be permitted as by notching the front wall portions 77 and 80 as indicated at 105 and 106.

Similarly, the bottom portion of the U-shaped member 83 should be notched as indicated at 107 to permit the pusher member 101 to pass the lower portion and directly engage the cartridges contained within the magazine.

If desired, the distributing member 90 may be retained in its closed position as by providing a hinged catch 108 which is pivotally secured to the forward wall portion 77 as indicated at 109 in a position to be moved into a locking position extending across the back of the distributing member 90.

In the foregoing I have described the operation of both forms of the magazine of my invention and operation of the feeding mechanism of my invention as being adapted for use with a bolt-action type of rifle. It will, of course, be apparent from the description in which the feeding mechanism is driven by the action of the bolt that the same principles of operation may be adapted to use with automatic rifles or machine guns by merely appropriately linking the feeding mechanism to the bolt or equivalent reciprocating firing and ejecting mechanism.

Attention is also directed to the fact that the magazine of my invention obviates the necessity of handling cartridges one at a time and instead permits one or more entire boxes of cartridges as they are supplied from the factory to be emptied as a unit into the magazine and that the magazine and feeding mechanism described hereinbefore function feed cartridges into the firing mechanism of the gun in a proper manner so as to permit the firing of such cartridges.

Attention is furthemore directed to the fact that this proper feeding of the cartridges is obtained irrespective of the manner in which the cartridges are packed within the box.

While I have shown and described the preferred embodiment of my invention, I do not desire to be limited to any of the details of construction shown or described herein, except as defined in the appended claims.

I claim:

1. A fire arm magazine comprising a box-like member defining an interior space closely conforming in size and shape to the interior of a factory packed box of cartridges with which said magazine is to be used; a slidable cover for closing said box-like member; and a plurality of separating members carried by said cover in a position to separate said cartridges into a plurality of rows upon closing of said cover.

2. In a fire arm including a cartridge firing chamber and an action for firing and ejecting cartridges from said firing chamber, the combination of: a box-like magazine capable of receiving the entire contents of a factory packed box of cartridges with which said magazine is to be used and holding said cartridges in substantially the same relative positions as that occupied by said cartridges in said box; pusher means normally urging said cartridges toward one end of said magazine to provide a stack of cartridges adjacent thereto; a feeding member projectable into said magazine to engage an end cartridge in said stack; means mounting said feeding member for movement through said magazine in the direction of the length of said stack; means coupling said feeding member to said action and responsive to operation thereof for positively moving said feeding member upwards a distance substantially equal to the diameter of one of said cartridges to thereby expel from said magazine the opposite end cartridge of said stack; means for conveying a cartridge so expelled to said action; and spacer means on said feeding member for filling the spaces left by each feeding movement of said stack to thereby hold the remainder of said cartridges against movement toward said one end of said magazine.

3. In a fire arm including a cartridge firing chamber and an action for firing and ejecting cartridges from said firing chamber, the combination of: a box-like magazine capable of receiving the entire contents of a factory packed box of cartridges with which said magazine is to be used and holding said cartridges in substantially the same relative positions as that occupied by said cartridges in said box; pusher means normally urging said cartridges toward one end of said magazine to provide a stack of cartridges adjacent thereto; a feeding member projectable into said magazine to engage an end cartridge in said stack; means mounting said feeding member for movement through said magazine in the direction of the length of said stack; means coupling said feeding member to said action and responsive to operation thereof for positively moving said feeding member upwards a distance substantially equal to the diameter of one of said cartridges to thereby expel from said magazine the opposite end cartridge of said stack; means for conveying a cartridge so expelled to said action; spacer means on said feeding member for filling the spaces left by each feeding movement of said stack to thereby hold the remainder of said cartridges against movement toward said one end of said magazine; and means responsive to the expulsion of the last cartridge from said stack for moving said feeding member and said spacer means downwards through said magazine to a position away from said magazine to permit said pusher means to move the cartridges remaining in said magazine to the end of said magazine to define a new stack of cartridges to be engaged by said feeding member.

4. A fire arm magazine comprising a box-like member defining an interior space closely conforming in size and shape to the interior of a factory packed box of cartridges with which said magazine is to be used; a cover mounted on said box-like member for movement between open and closed positions; a plurality of separating members; and means coupling said separating members to said cover for moving said separating members to a position separating said cartridges into a plurality of rows upon closing of said cover.

5. A fire arm magazine comprising a box-like member defining an interior space closely conforming in size and shape to the interior of a factory packed box of cartridges with which said magazine is to be used; a closable cover for said box member; a plurality of separating members; means coupling said separating members to said cover for moving said separating members to a position separating said cartridges into a plurality of rows upon closing of said cover; and means coacting with said cover and releasable in response to closing thereof for urging all of said rows of cartridges toward one end of said box member.

6. A fire arm magazine comprising a box-like member defining an interior space closely conforming in size and shape to the interior of a factory packed box of cartridges with which said magazine is to be used; a closable cover for said box member; a plurality of thin flat fingers carried by said cover in a position to be moved lengthwise between said cartridges upon closing of said cover to divide said cartridges into a plurality of rows; a pusher member in said box member for engaging said cartridges, said pusher member having formed therein a plurality of slots for receiving said fingers; and spring means extended between an end of said box member and said pusher member and releasable upon closing of said cover member to resiliently urge said pusher member into engagement with said cartridges.

7. A fire arm magazine comprising a box-like member defining an interior space closely conforming in size and shape to the interior of a factory packed box of cartridges with which said magazine is to be used; a slidable cover for closing said box-like member; a support; means mounting said support on said cover for limited angular movement about an axis parallel to the length of said cartridges; a plurality of spaced separating members of substantially equal length; and means securing one end of each of said separating members to said support for limited angular movement about axes disposed parallel to the length of said cartridges, whereby angular movement of said support disposes the other ends of said separating members in staggered relationship and whereby closing of said cover slides said supporting members between said cartridges to separate the same into a plurality of rows.

WOODVILLE B. CONWAY.